United States Patent [19]

Mosimann et al.

[11] 3,960,799

[45] June 1, 1976

[54] HEAT-RESISTANT ADHESIVE LACQUERS AS WIRE COATINGS

[75] Inventors: Hans Mosimann, Breitenbach; Peter Heim, Basel; Charles Borer, Grindel, all of Switzerland

[73] Assignee: Schweizerische Isola-Werke, Switzerland

[22] Filed: Sept. 12, 1974

[21] Appl. No.: 505,498

[30] Foreign Application Priority Data

Sept. 13, 1973 Switzerland................... 13135/73

[52] U.S. Cl..................... 260/30.2; 156/47; 428/263; 260/31.2 R; 260/31.6; 260/32.6 R; 260/32.8 EP; 260/33.4 EP; 260/33.6 EP; 260/830 P; 260/835; 260/858
[51] Int. Cl.².................. C08G 45/12; C08G 51/44
[58] Field of Search............... 260/830 P, 858, 835, 260/30.2, 31.2, 31.6, 32.6, 32.8, 33.4, 33.6

[56] References Cited
UNITED STATES PATENTS

| | | | |
|---|---|---|---|
| 3,177,090 | 4/1965 | Bayes | 260/858 |
| 3,311,527 | 3/1967 | Urbanic | 260/858 |
| 3,320,090 | 5/1967 | Graubart | 260/858 |
| 3,384,679 | 5/1968 | Stetz | 260/830 P |
| 3,395,118 | 7/1968 | Reinking | 260/835 |
| 3,504,627 | 4/1970 | Elder | 260/858 |
| 3,714,289 | 1/1973 | Schober | 260/830 P |

Primary Examiner—Murray Tillman
Assistant Examiner—T. Pertilla
Attorney, Agent, or Firm—Wenderoth, Lind & Ponack

[57] ABSTRACT

A heat-curable adhesive lacquer is provided which comprises:

(a) a polyurethane-ester-imide having (i) terminal isocyanate groups blocked by a monohydric phenol, and (ii) free hydroxyl groups and (b) an essentially linear epoxide or polyester resin having secondary hydroxyl groups and a molecular weight of above 30,000, the lacquer achieving, on drying, a B-state which is stable on storage such that the lacquer softens again when further heat is supplied to give a cross-linked resin in the C-state, which is heat stable.

5 Claims, 1 Drawing Figure

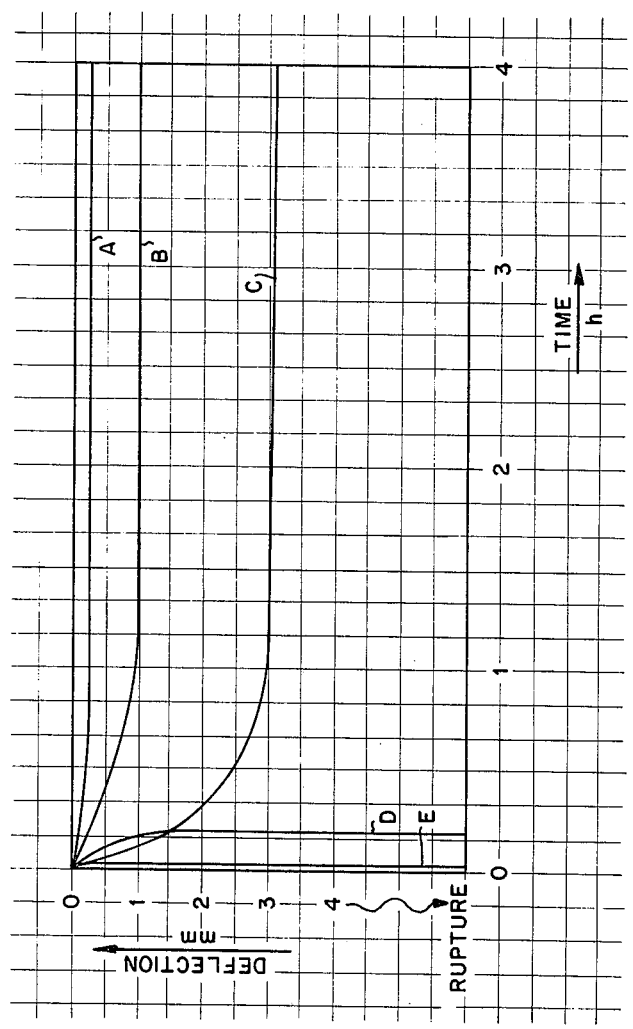

HEAT-RESISTANT ADHESIVE LACQUERS AS WIRE COATINGS

This invention relates to a heat-resistant curable adhesive lacquer for coating electrically insulated wires and for sticking these wires together by heating, with the formation of a cured, heat-resistant wire coiling. Wires coated with the adhesive lacquer according to the invention can be stuck to one another by the action of heat and the resulting adhesive layer can be cured by the supply of greater heat.

So-called stovable lacquered wires have been available commercially for about 20 years. They are constructed by applying a so-called adhesive or stoving layer on top of a normal insulating layer. The lower layer represents the actual insulation and the upper layer serves to stick the turns of wire to one another. The thickness of the lower layer usually corresponds to "Auftragsklasse" (coating category) $C_0$ or $C_1$ [in accordance with Standard Sheet No. 23,745 (1967) of the Verein Schweizerischer Maschinenindustrieller (Association of Swiss Machinery Manufacturers) (Kirchweg 4, Postfach, Zurich; abbreviated to VSM in the following text)]; these coating categories correspond to those according to Publication No. 182 (1964) of the Bureau Central de la Commission Electrotechnique Internationale (Central Office of the International Commission on Electrical Engineering) [1, rue de Varembé, Geneva; abbreviated to CEI in the following text] and with the additional adhesive layer the wire attains an outer diameter corresponding to one of the coating categories $C_1$ or $C_2$ (VSM).

To date, practically only thermoplastic synthetic resins have been used as lacquers for the adhesive layer, the resins being selected so that they produce, on the wire, a layer which is hard and smooth at room temperature. After winding this wire on a former, the windings can be stuck together by heating. On heating, the upper layer of the wire coating is softened. It is compressed by the pull of the wound wire, or flows to a certain extent and, after cooling, a bonded winding remains on the former. The former is generally constructed in several parts, so that the winding can subsequently be released from the former. In this way it has become possible to manufacture self-supporting coils, small frame coils, deflecting coils for television and the like, without having to fix the winding as before by an impregnation process with another lacquer. Heating can be carried out in a drying cabinet, by means of hot air while winding or by a surge of current after winding. Moistening of the thermoplastic layer by means of suitable solvents is also used for sticking the windings.

These adhesive layers make hardly any contribution to the insulation of the wire; they serve solely for sticking.

The adhesive lacquers are excellent as long as the operating temperature of the winding hardly rises above room temperature or as long as it always remains substantially below the softening point of the adhesive layer. However, as soon as higher operating temperatures arise, the strength of the bonding falls and the winding can be deformed and finally fall apart. The polyvinylbutyrals initially used as the adhesive layer have therefore been replaced by more suitable polyamides. This helps to some extent because the softening point is higher, but the main deficiency still remains and it is not possible to use such windings safely at higher operating temperatures.

High quality insulating lacquers are known today which make it possible to manufacture primary layers which permit operation even at temperatures above 200°C. A gap thus exists, in that the properties of the thermoplastic layers used up to now are not adequate to enable the wide operating temperature range of the insulating layer to be exploited with self-supporting windings also, without having to reimpregnate.

With motor windings in particular, the use of wire windings which remain stuck at higher temperatures could open up new fields of application. The time taken to manufacture a winding ready for use can be shortened by the use of the adhesive lacquered wires, since a separate impregnation process is dispensed with, and this can also be of interest for repair workshops. It is also not absolutely necessary that sticking takes place within seconds; several minutes can be regarded as acceptable.

A satisfactory solution is offered if the adhesive layer is not only thermoplastic but also curable. Previous efforts, directed at fixing the windings by current surge within seconds (such as was the case for deflecting coils for television, small frame coils in measuring instruments and the like) took into consideration only sticking which was as rapid as possible, which could only be achieved with a thermoplastic. There was therefore no thought given to use in motors, for example for the manufacture of field coils. On condition that the winding is stoved to give lasting firmness, it is, however, now possible to manufacture coils of this type using stickable wires. If the wires were to loosen during operation, the primary lacquer layer would then rapidly be damaged by rubbing. Windings manufactured by present-day processes must therefore be lacquered by a special impregnation process in winding shops or by the consumer. The subsequently dried impregnating lacquer takes over the role of fixing and of protection against atmospheric effects.

Since the impregnating lacquers contain solvents or give off monomers, the impregnation process is associated with certain hazards for the personnel concerned therewith. Moreover, a drying period of at least 4 hours is needed with lacquers containing solvents and additional operations on the winding are required. The use of the adhesive lacquered wires thus simplifies the work and reduces the possiblities of injury to the health of the workforce from solvents.

Although curable adhesive lacquered wires had earlier been manufactured from polyvinylbutyrals in a mixture with phenolic resins, these were thermally suitable for, at most, operating temperatures of 120°C. The temperature stability of the adhesive layer should, however, reach at least approximately that of the primary layer; for this reason these mixtures are, from the start, not suitable for use in apparatus of heat resistance categories F (155°C) and H (180°C). [Publication No. 85 (1957) CEI].

For use in apparatuses of category F, inter alia combinations of epoxides with isocyanates (British Pat. Specification No. 1,285,463) or of epoxides with titanates (German Offenlegungsschrift No. 1,960,888) are proposed for the adhesive layers. Such combinations are, in part, indeed heat-curable, but a great deal of time is required for curing at temperatures in the region of the heat category temperature, which has an unfavourable effect on the course of work. Furthermore, their chemical resistance, for example against refrigerants, is also inadequate.

Lacquers based on ester-imide are known for their outstanding resistance to heat and chemicals. They are at present used mainly as wire and impregnating lacquers which are heat-resistant at elevated temperature. In the uncross-linked state (i.e. only dried on; B-state), wire lacquers of this composition are very brittle and therefore such coated wires can not be wound under any circumstances. In addition, relatively high temperatures are necessary for curing. On the other hand, it is practically impossible to dry ester-imide impregnating lacquers without simultaneous crosslinking, since the curing reaction already starts under the action of the heat required for drying, so that a later sticking is no longer possible.

As a result, it has previously been completely impossible to manufacture, on the basis of ester-imides, flexible films which make handling of the wire possible, since ester-imides normally give flexible and non-sticky films only after curing.

It has now surprisingly been found, that by using a lacquer based on polyurethane-containing polyesterimides, of a previously unknown structure, and on high-molecular epoxide resins, adhesive layers can be achieved which satisfy these requirements and, in addition, largely retain the known thermal and chemical stability of pure ester-imides.

The curable adhesive lacquer, according to this invention, for coating electrically insulated wires, is characterised in that it comprises (a) a polyurethane-ester-imide having terminal isocyanate groups blocked by a monohydric phenol, and, at the same time, having free hydroxyl groups, and (b) an essentially linear epoxide resin having secondary hydroxyl groups and a molecular weight of above 30.000, the lacquer achieving, on drying, a B-state in which it is stable on storage, which state is produced by a partial reaction of isocyanate groups, which are available or are formed by resplitting of the phenylurethane groups, with the secondary hydroxyl groups of the said epoxide resin, so that the highmolecular molecule formed on the wire already exhibits such tough and elastic properties that it withstands the mechanical and electrical tests, in particular the winding test of the wire standard specifications, but that the lacquer layer softens again when further heat is supplied and, by an intramolecular and intermolecular further reaction to give a crosslinked molecular coupling in the C-state, sticks adjoining wires to one another, so that an adhesive bond is formed which is stable under the temperatures which are likely to arise in operation.

Instead of the high-molecular epoxide resin mentioned, another linear compound having secondary hydroxyl groups and a molecular weight above 30,000, such as a corresponding polyester resin (or alkyd resin), can be used as component (b). The use of the epoxide resin mentioned, however, represents a particularly advantageous embodiment of the invention.

Further, in the curable adhesive lacquer according to the invention, a particularly preferred group should be singled out, in which the adhesive lacquer is characterised in that it consists of (1) a compound of components A and B, wherein A corresponds to an ester-imide containing hydroxyl groups, which can be synthesised from a dicarboxylic acid of the formula:

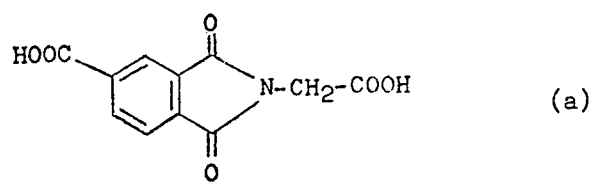

(a)

and polyalcohols of the formula:

$$HOCH_2-CH_2-O-CH_2-CH_2-O-CH_2-CH_2OH$$ (b₁)

and

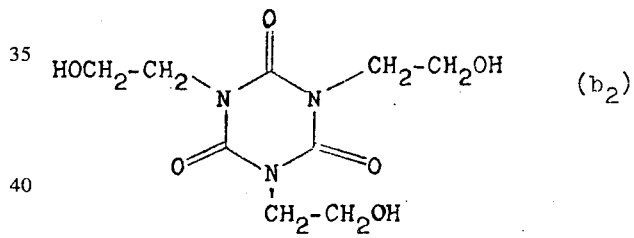

(b₂)

, preferably in the molar ratios:
a:(b₁ = b₂) = 1:1.2 to 1:2
b₁:b₂ = 1:1 to 10:1
and B corresponds to a polyfunctional compound, containing isocyanate groups, especially of the formula:

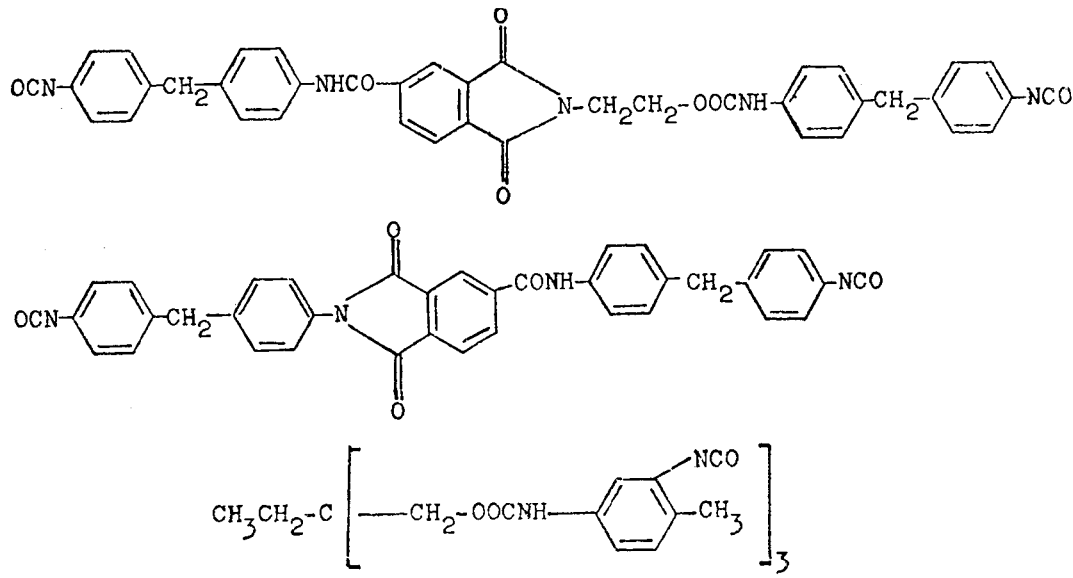

or

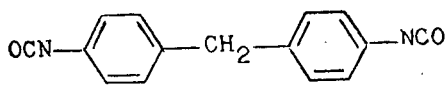

or mixtures thereof and the ratio of the hydroxyl groups to the isocyanate groups is preferably from 1:1 to 1:1.5, (2) an essentially linear epoxide resin, having secondary hydroxyl groups and a molecular weight above 30,000, (3) a monohydric phenol, which blocks the isocyanate groups remaining in the polyester-imide of the above formula, and (4) an organic solvent, which can be the same as the phenol mentioned under (3).

The components used for the synthesis of fragment A of the polyester-imide (1) are, on the one hand, trimellitic anhydride and glycine and, on the other hand, the poly-alcohols triethylene glycol and tris-(2-hydroxyethyl) isocyanurate. An example of such a fragment A can be represented by the following formula:

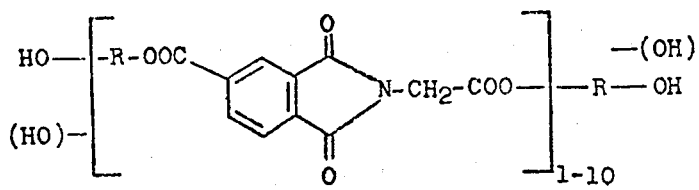

in which the symbol R represents the divalent radical from one of the alcohols $b_1$ and $b_2$ mentioned previously.

No matter what proportion the alcohols mentioned are present in fragment A, there is, in every case, an excess of hydroxyl groups, in the polyester-imide containing urethane, these hydroxyl groups are then present in the form of urethane bonds with the isocyanate groups of the compound or compounds B.

The adhesive lacquer contains, as the second major component, a high-molecular epoxide resin (2). This is preferably understood to be an epoxide resin with an average molecular weight of 30,000 to 200,000. A high-molecular copolymer of epichlorohydrin and bisphenol A - or 2,2-(4,4'-dihydroxydiphenyl)-dimethylmethane, $HOC_6H_4$-C$(CH_3)_2$-$C_6H_4OH$ - is preferably employed as the epoxide resin. For example, the commercial products Epikote 53-L-32 (molecular weight approx. 80,000) and Epikote 55-L-32 (molecular weight approx. 200,000) from Messrs. Shell can be used with advantage as the epoxide resin. In these products the hydroxyl value is approximately 0.35 (that is to say approximately 0.35 equivalent weight of OH per 100 g of product); on the other hand, it is practically no longer possible to determine an epoxy equivalent since the number of epoxy groups in the molecule is so low. The proportion of epoxide resin can, for example, amount to approximately 80% by weight, and more, of the solid substances.

The monohydric phenol (3) can, in particular, be phenol itself or a cresol or a xylenol. The proportion thereof in the adhesive lacquer should be at least sufficient to block the isocyanate groups present in the polyesterimide. The phenol thus serves at the same time to regulate the course of the polyaddition reaction between the isocyanate groups and hydroxyl groups at elevated temperature. At the same time, the phenol also represents a preferred solvent or the major component of a preferred solvent mixture. In general, therefore, a larger quantity of the phenol is used than the minimum proportion already mentioned. Additionally the phenol helps to regulate the viscosity of the adhesive lacquer to the level desired for the use, that is to say the application to the wire or other conductor.

If the phenol is used only in the minimum proportion necessary for blocking the isocyanate groups, an organic solvent (4) should be present in the lacquer. The polyesterimide, and the epoxide resin added next, should be present in the dissolved state, so that a uniform and smooth layer is formed on the wire. Suitable solvents are, in particular, hydrocarbons, for example benzene, toluene or xylene, Solvesso (hydrogenated petroleum distillate of density 0.797 to 0.937, similar to light petroleum) or solvent naphtha; carboxylic acid esters, for example ethyl acetate, butyl acetate, methylglycol acetate or ethylglycol acetate; ketones, for example methyl ethyl ketone or methyl isobutyl ketone; furter dimethylformamide, dimethylacetamide, N-methylpyrrolidone and the like. The solvent serves, at the same time, to adjust the viscosity of the adhesive lacquer, as mentioned above in the case of the phenol.

It is known that urethanes are formed by the reaction of isocyanates and alcohols and that the urethanes are subject to re-splitting into the starting components (see, for example, Vieweg-Hoechtlen, "Polyurethane"; Hanser, Munich, 1966, page 11). A thermal equilibrium exists between urethane and the starting components:

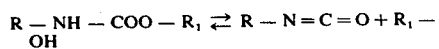

It is also known (loc. cit.) that the polyurethanes with secondary hydroxyl groups are considerably more stable than those with primary hydroxyl groups.

It has now been found that, under the conditions which prevail during sticking (approx. 180°C), the urethane groups of the compounds mentioned partially re-split and give considerably more stable compounds with the secondary hydroxyl groups of the epoxide resin, which compounds contribute to the good heat stability of the lacquer layer.

Stable crosslinking is also possible between the terminal blocked isocyanate groups and the secondary hydroxyl groups of the epoxide resin.

Finally, a reaction of the terminal isocyanate groups with the very sparse terminal epoxide groups is also possible.

Thus, facilities exist for varying the number of the reactive groups of the ester -imide containing urethane in relation to the secondary hydroxyl groups of the epoxide resin, by changing the quantitative proportions.

The epoxide resin has a two-fold function in the composition of these lacquers: as long as the lacquer has not yet reached the sticking stage, it assists in lowering the softening point of the adhesive lacquer layer, so that the sticking can be carried out at temperatures between approx. 150° and 200°C. In the final cured lacquer layer, the ratio of the epoxide resin to the urethane-ester-imide component determines the strength of the crosslinking and thus the strength of sticking.

When the lacquer according to the invention is applied to the wire, particularly suitable lacquer layers are formed which can be dried on easily — for example in a drying cabinet — to give a smooth, flexible coating which is not sticky at room temperature and which adheres firmly to the lower insulating layer. The resin is in the B-state. The covering layer is suitably dried in a drying cabinet at a lower stoving temperature than the primary layer. By reason of these properties, the resulting lacquered wire can be transported easily, can be stored for an indefinite length of time and, last but not least, can be wound very easily. Moreover, the adhesive lacquer itself is also capable of storage and has practically unlimited stability at room temperature. From the mechanical and electrical point of view, the wire meets the demands of the existing standard specifications.

The turns of wire formed during winding, which are in contact with one another, can then be stuck together by the supply of heat and can be cured simultaneously or subsequently. In fact, the lacquer layer softens, depending on the composition, at temperatures between 100° and 200°C, usually above 150°C, and the windings stick together under slight pressure and remain stuck during and after cooling; it should be further pointed out that the lacquer does not become brittle. The application of heat can, for thin wires, be by means of a current surge or by hot air or finally, and for thicker wires, by means of a heated mould. With thicker wires, in particular, it is not absolutely necessary to effect sticking in a few seconds; periods of half an hour up to about five hours can quite easily be employed.

After this period of time, sufficient curing has already been achieved to withstand heat exposure in the range of heat resistance categories F (150°C) and H (180°C). The application of heat initiates the curing of the lacquer, that is to say the formation of cross-links, as a result of a chemical reaction. This converts the thermoplastic products into a tough and elastic state, so that the lacquer does not become brittle. Because of the cross-links, disintegration of the winding is not possible without decomposition of the lacquer substance, in contrast to the known behaviour of the thermoplastics. What in fact happens in the case of pure thermoplastics is that the inadequate dimensional stability of the winding at elevated temperature and under the action of a force leads to a continuously progressive deformation. As a result of the crosslinking mentioned, that is to say as a result of the conversion into the tough and elastic state, greater dimensional stability of the winding is, in contrast, achieved, preventing disintegration of the latter at the same temperatures; accordingly, the new adhesive lacquer completely fulfils the function of the impregnating lacquer hitherto demanded.

The bonding of the wire coils to one another, which has taken place, can be measured by the "helicoidal coil" method (see experimental section); it has been found that the adhesion at least corresponds to that of an impregnating lacquer of the same heat resistance category. Under the operating conditions, the degree of curing continues to increase (as a result of the continuing application of heat), in general to more than 100, and accordingly the adhesion at elevated temperature also continues to increase.

Summarising, the adhesive lacquer according to the invention produces by itself, that is to say without subsequent impregnation of the winding, a firm bonding of the wire coils, which is completely heat-resistant and durable even at elevated temperatures, such as occur in the winding during operation, without, however, the lacquer becoming brittle at the same time.

The following Examples further illustrate this invention.

EXAMPLE 1

A. 800 parts by weight of cresol, 4 parts by weight of lead acetate trihydrate, 262.5 parts by weight of triethylene glycol, 130.5 parts by weight of tris-(hydroxyethyl)-isocyanurate, 112.5 parts by weight of glycine and 288 parts by weight of trimellitic anhydride are introduced, in the sequence mentioned, into a reaction vessel fitted with a stirrer and descending condenser. The mixture is heated, whilst stirring, so as to reach 200°C in approximately 4 hours. The temperature is so regulated that as much water as possible, but little cresol, distils. After the temperature has been maintained at 200° to 210°C for 8 hours, the reaction is complete. The mixture is allowed to cool and approx. 1,450 parts by weight of a cresol solution containing an ester-imide are obtained. 600 parts by weight of xylene and 300 parts by weight of methylglycol acetate are added, the mixture is heated to 85°C whilst stirring and 2 to 5% of volatile constituents, in the main water, are allowed to distil off under slightly reduced pressure. After completion of the dehydration, 250 parts by weight of p,p'-diphenyl-methanediisocyanate are added whilst stirring and the vessel is closed. The exothermic reaction which commences causes the temperature to rise to approx. 100°C; the reaction is allowed to continue for 30 minutes at this temperature. The mixture is first diluted with 350 parts by weight of dehydrated cresol, thereafter adjusted to the desired viscosity, for example 100 cP for felt lacquering, with a mixture of 55 parts by weight of cresol, 30 parts by weight of xylene and 15 parts by weight of methylglycol acetate, and filtered.

B. The product from section A is mixed with Epikote 53-L-32 (Shell) so as to provide one part by weight (of solids) of the epoxide resin per one part of solids from section A.

EXAMPLE 2

The product of Example 1A is mixed with Epikote 55-L-32 (Shell) so that the proportions of solid are in the ratio of 1:4.

EXAMPLE 3

800 parts by weight of cresol, 4 parts by weight of lead acetate trihydrate, 300 parts by weight of triethylene glycol, 261 parts by weight of tris-(hydroxyethyl)-isocyanurate, 112.5 parts by eight of glycine and 288 parts by weight of trimellitic anhydride are introduced, in the sequence mentioned, into a reaction vessel equipped with a stirrer and descending condenser. The mixture is heated, whilst stirring, so as to reach 200°C in approximately 4 hours. The temperature is so regulated that as much water as possible, but little cresol, distils. After the temperature has been maintained at 200° to 210°C for 8 hours, the reaction is complete.

The mixture is allowed to cool, 600 parts by weight of xylene and 300 parts by weight of methylglycol acetate are added, the whole is heated to 85°C whilst stirring and 2 to 5% of volatile constituents, in the main water, are allowed to distil off under slightly reduced pressure, after which the mixture is allowed to cool. 300 parts by weight of cresol, 192 parts by weight of trimellitic anhydride and 37.5 parts by weight of glycine are introduced into another reaction vessel, equipped with a stirrer and descending condenser. The mixture is heated, whilst stirring, so as to reach 210°C in approximately 4 hours. The reaction is allowed to take place at this temperature until no further water of reaction distils off, which is the case after about 5 hours. Thereafter, the following are added whilst stirring: 700 parts by weight of dehydrated cresol, 1,000 parts by weight of Solvesso 100 and 750 parts by weight of p,p'-diphenylmethanediisocyanate. The mixture is again heated to 160°–170°C whilst stirring and at the same time the evolution of $CO_2$ is followed by means of a gas meter attached to the reflux condenser. After 3 to 4 hours, the evolution of $CO_2$ has ended and the mixture is allowed to cool. Both preparations are now combined and heated to 130°–150°C whilst stirring. The reaction is allowed to take place in this temperature range until a clear solution results (30 to 120 minutes) and the solution is then cooled to below 50°C.

Finally, 10,000 parts by weight of Epikote 55-L-32 and 1,000 parts by weight of dimethylformamide are added and the mixture is stirred well and is then filtered.

EXAMPLE 4

The procedure followed is as in Example 1A, but 300 (instead of 262.5) parts by weight of triethylene glycol and 44 (instead of 130.5) parts by weight of tris-(hydroxy-ethyl)- isocyanurate are used. Furthermore, following the addition of the p,p'-diphenylmethanediisocyanate the reaction is not carried out for 30 minutes at approx. 100°C but for approx. 30 minutes at 140°C, that is to say until an increase in viscosity to 5,000 – 6,000 cP, measured at 20°C, has been reached. Immediately prior to the filtration, 1,400 parts by weight of Epikote 55-L-32 are also stirred in.

Using these lacquers, a wire lacquered with a polyester-imide to VSM coating category $C_1$ (International Grade 1) is further lacquered to VSM coating category $C_2$ (International Grade 2). For example, a copper wire of 0.40 mm diameter can first be coated with an esterimide lacquer so that the increase in the diameter $d_1-d$ is 37 μm, and over this an adhesive lacquer coating $d_2-d_1$ of 18 ± 3 μm can be applied. The stoving conditions must be maintained at such values that the adhesive coating is dried but not cured; for example, the average oven temperature is 300°C when running at a speed of 35 m/minute, and using an oven 2.5 m long.

The lacquered wire is then formed into a coil and bonded; for the lacquer according to Example 1, this requires 30 minutes at 170° ± 10°C.

Table 1 gives a comparison of the adhesion and heat resistance, at elevated temperature, of adhesive lacquers previously known and adhesive lacquers according to the present invention. The comparison shows that the adhesive lacquers according to the present invention give values which at least correspond, at elevated temperatures, to those of impregnating lacquers of the same heat resistance category.

Table I

| | Baking for 30 minutes/180°C | | | | | Baking for 2 hours/180°C | | | |
|---|---|---|---|---|---|---|---|---|---|
| | Adhesion in N[1] | | | Creep resistance in minutes Force applied: 1 N | | Adhesion in N[1] | | | Creep resistance in minutes Force applied: 2 N |
| | 20°C | 160°C | 200°C | 160°C | 200°C | 20°C | 160°C | 200°C | 200°C |
| Polyvinyl butyral | 60 | 1 | <1 | <1 | <1 | 68 | 2 | <1 | <1 |
| Epikote 53-L-32 or 55-L-32[2] | 70 | 3 | <1 | <1 | <1 | 65 | 3 | <1 | <1 |
| Example 1 | 90 | 4 | 3 | >300 | >300 | 90 | 6 | 5 | >300 |
| Example 2 | 95 | 3 | 2 | >300 | >300 | 86 | 6 | 4 | >300 |
| Example 3 | 100 | 5 | 3 – 4 | >300 | >300 | 92 | 9 | 7 | >300 |
| Example 4 | 90 | 3 | 2 | >300 | >300 | 76 | 5 | 4 | >300 |
| Lacquer SIB 757[3] | 100[) | 4[4] | 3[4] | >300[4] | 300[4] | 95[4] | 5[5] | 4[5] | >300[5] |

1 For method of determination, see below.
2. High molecular linear copolymers of bisphenol A and epichlorohydrin.
3. SIB 757 is an impregnating lacquer based on an esterimide, for use in equipment of category F.
4. Here, the wire coils (without adhesive coating), were impregnated so that following the drying prescribed for the impregnating lacquer, the coating thickness of the impregnation was equal to that of the adhesive coatings in the case of the adhesive lacquer wires.
5. As above for for (4), but post-cured for 2 hours at 180°C.

Method for testing the adhesion of lacquered wire coils

The adhesion of the wire is tested by the method according to Publication No. 290 (1969) CEI. This method is actually intended for measuring the adhesion of impregnating lacquers. In this method, impregnating lacquer is applied by dipping onto an aluminium wire which is wound on a mandrel to form closely adjacent coils of 1 mm diameter and 75 mm length, and is dried in accordance with the instruction. The force necessary to pull this winding apart is then measured.

Analogously, the aluminum wire can now be replaced by normal copper wire and the impregnating lacquer by the adhesive lacquer according to the invention. The method was modified so that a lacquered wire of 0.40 mm diameter was coated with the adhesive lacquer and stoved. The wire was then wound on a mandrel of 6.3 mm diameter under a load of 0.7 N (1 Newton (N) = 102 g or 1 kg : 9.81) and the winding was then baked. The adhesion was determined at various temperatures, as in the instruction.

The question arises, in this context, of how the absolute level of bonding is to be assessed. In other words, how high must the adhesion be, for example at the temperature of heat resistance category F (155°C), if one is to be able to regard it as adequate for the winding. This problem was solved by first providing the winding with a base lacquer coating (without adhesive coating) and thereafter with an impregnating lacquer of the heat resistance category in question. Since this lacquer is recognised to give sufficient bonding, the values obtained for such windings at various temperatures can be taken as a guideline and it can be postulated that all adhesive lacquer wires of which the windings give, at the temperatures measured, at least equal, or higher, values of the adhesion than those obtained on the impregnated windings, will prove satisfactory in operation.

Finally, a comparison will be given to show the difference between prior thermoplastic adhesive coatings and those according to the invention.

The test was carried out according to CEI instruction No. 290 Helicoidal Coil Test. 0.4 mm thick wires were insulated using the same polyester-imide as a base coating. Over the top of this, the following were applied for a certain length
a. a polyamide-based lacquer commercially available for such purposes and
b. a lacquer according to the invention.

The coils for the test were produced from the adhesive wires produced according to a) and b), and were baked for 30 minutes at 180°C. They were then incorporated in the experimental arrangement and subjected to a force of 1 N.

The experiments were then carried out at 160, 180 and 200°C. The drawing shows the results. Therein, curves A, B and C show the behaviour of an adhesive wire, manufactured using the lacquer according to the invention, at 160°C, 180°C and 200°C, whilst curve D and curve E respectively show the behaviour of a polyamide-based adhesive wire at 160°C and 200°C.

The deflection of the coils is plotted as a function of the time. In both experiments with a thermoplastic coating, the coil kinks within a few minutes and breaks, as was to be expected, first at the higher temperature. Using the curable adhesive lacquer coating according to the invention, deflection of the coil admittedly still occurs since 30 minutes at 180°C do not suffice for complete curing. However, during the experiment the coating cures furher and stabilises itself in the manner indicated.

We claim:
1. A heat-curable adhesive lacquer for coating electrically insulated wires consisting essentially of:
   1. a polyurethane-ester-imide having terminal isocyanate groups blocked by a monohydric phenol, said polyurethane-ester-imide being derived from (A) an ester-imide containing hydroxyl groups obtained from a dicarboxylic acid of the formula:

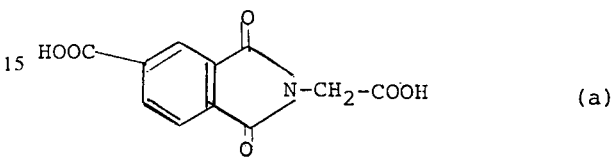

(a)

and a polyalcohol of the formula:

$HOCH_2-CH_2-O-CH_2-CH_2-O-CH_2-CH_2OH$      (b₁)

and of the formula:

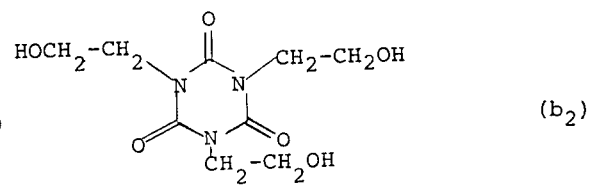

(b₂)

in the molar ratios:
a : (b₁ + b₂) = 1 : 1.2 to 1 : 2
b₁ : b₂ = 1 : 1 to 10 : 1
and (B) a polyisocyanate of the formula:

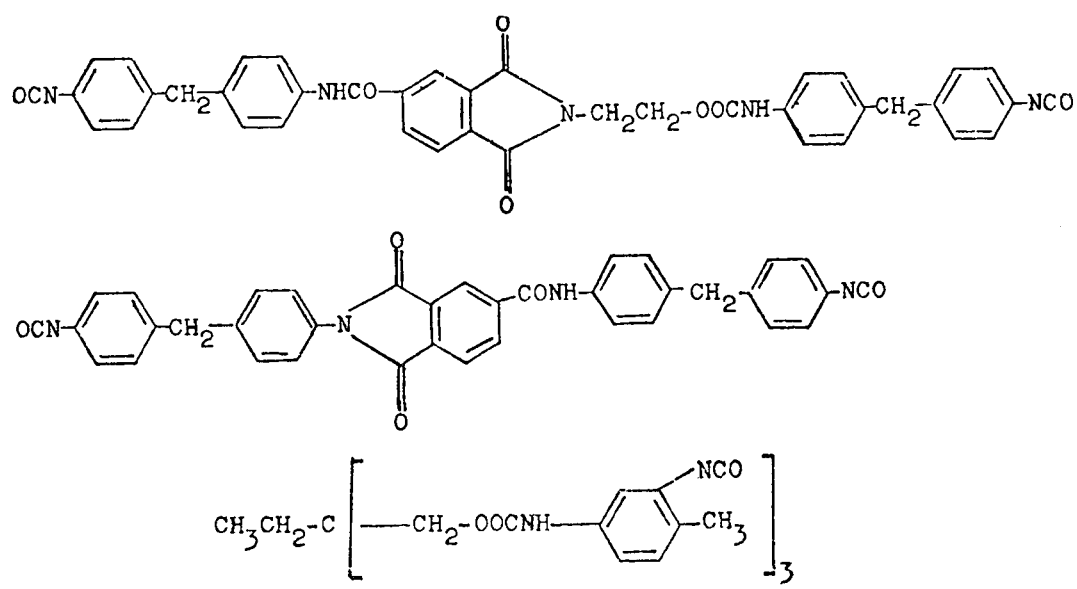

or

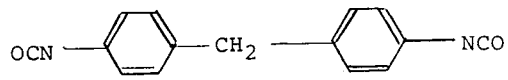

or a mixture of two or more thereof and the ratio of the hydroxyl groups to the isocyanate groups is from 1 : 1 to 1 : 1.5 and 2. an essentially linear epoxide resin having secondary hydroxyl groups and a molecular weight of at least 30,000, the lacquer, on drying, being a storage-stable at room temperature and being in a non-adhesive state such that the lacquer softens on further heating to give a thermoset, adhesive, heat-stable resin.

2. A lacquer according to claim 1 in which the epoxide resin is a condensation product of bisphenol A and epichlorohydrin.

3. A lacquer according to claim 1 in which the monohydric phenol is phenol, a cresol or a xylenol.

4. A lacquer according to claim 1 which comprises as a solvent, the monohydric phenol, in excess over the minimum proportion necessary for blocking the isocyanate groups, or a different organic solvent, or a mixture of said monohydric phenol and said organic solvent.

5. A lacquer according to claim 4 wherein the organic solvent is a hydrocarbon, a carboxylic acid ester, a ketone, dimethylformamide, dimethylacetamide or N-methylpyrrolidone or a mixture thereof.

6. A lacquer according to claim 1 wherein the proportion of epoxide resin is 80% or more based on solids present.

* * * * *